United States Patent
Chiang

(10) Patent No.: US 11,515,589 B2
(45) Date of Patent: Nov. 29, 2022

(54) TEMPERATURE EQUALIZATION AND HEAT DISSIPATION CONTAINER STRUCTURE OF LITHIUM BATTERY AND COMBINATION MODULE THEREOF

(71) Applicant: AMITA TECHNOLOGIES INC., Taoyuan (TW)

(72) Inventor: Yuan-Li Chiang, Taoyuan (TW)

(73) Assignee: AMITA TECHNOLOGIES INC., Taoyuan (TW)

( * ) Notice: Subject to any disclaimer, the term of this patent is extended or adjusted under 35 U.S.C. 154(b) by 259 days.

(21) Appl. No.: 16/904,231

(22) Filed: Jun. 17, 2020

(65) Prior Publication Data
US 2021/0399359 A1 Dec. 23, 2021

(51) Int. Cl.
*H01M 10/655* (2014.01)
*H01M 10/613* (2014.01)
*H01M 10/052* (2010.01)

(52) U.S. Cl.
CPC ....... *H01M 10/655* (2015.04); *H01M 10/052* (2013.01); *H01M 10/613* (2015.04)

(58) Field of Classification Search
CPC . H01M 10/655; H01M 10/613; H01M 10/052
See application file for complete search history.

(56) References Cited

U.S. PATENT DOCUMENTS

2016/0293995 A1* 10/2016 Pasma ............... H01M 10/0468
2017/0256760 A1* 9/2017 Nietling ............. H01M 50/267

FOREIGN PATENT DOCUMENTS

| CN | 207967076 U | 10/2018 |
| TW | M594276 U | 4/2020 |

OTHER PUBLICATIONS

Office Action dated Oct. 22, 2020 of the corresponding Taiwan patent application No. 109115112.
Evaluation Report dated Jun. 9, 2021 of the corresponding Taiwan Utility Model M601463.

* cited by examiner

*Primary Examiner* — Karie O'Neill Apicella
(74) *Attorney, Agent, or Firm* — Chun-Ming Shih; HDLS IPR Services

(57) ABSTRACT

A temperature equalization and heat dissipation container structure of a lithium battery and a combination module thereof are disclosed. The temperature equalization and heat dissipation container structure of lithium battery includes a base and a housing frame erected on the base. The housing frame includes a pair of first heat conducting walls spaced apart from each other and a pair of second heat conducting walls spaced apart from each other. The base, the first heat conducting walls and the second heat conducting walls are enclosed to form a hollow accommodating area, and the pair of first heat conducting walls are erected with a pitch gradually widening from bottom to top.

8 Claims, 5 Drawing Sheets

TEMPERATURE EQUALIZATION AND HEAT DISSIPATION CONTAINER STRUCTURE OF LITHIUM BATTERY AND COMBINATION MODULE THEREOF

BACKGROUND OF THE INVENTION

Field of the Invention

The present invention generally relates to a lithium battery, and more particular, to a temperature equalization and heat dissipation container structure of a lithium battery and a combination module thereof.

Description of Related Art

The existing lithium battery can only output a limited voltage and current in the use of a single lithium battery cell. However, when applied in such as a power machinery or an equipment requires a large voltage or a high current, it is necessary to use a series or parallel connection of multiple lithium battery cells to constitute a set of assembly, and multiple assemblies are connected for using. Therefore, if there is no effective arrangement and connection planned to provide a good temperature equalization and heat dissipation, not only the overall occupied space is increased, but also the overall appearance will be damaged because of the expansion of the lithium battery because of overheating. Even the lithium battery cell is in a risk of Thermal-Run-Away during the charge and discharge process because of overheating and eventually causes battery burnt or explosion.

In view of the above drawbacks, the Inventor proposes the present invention based on his expert knowledge and elaborate researches in order to solve the problems of prior art.

SUMMARY OF THE INVENTION

Accordingly, an object of the present invention is to provide a temperature equalization and heat dissipation container structure of a lithium battery and a combination module thereof for positioning the lithium battery and to prevent from shaking; thus, the multiple lithium batteries can be ensured to contact with each other to provide a good heat transfer effect of temperature equalization and heat dissipation.

In order to achieve the object mentioned above, the present invention provides a temperature equalization and heat dissipation container structure of a lithium battery, comprising a base and a housing frame erected on the base. The housing frame includes a pair of first heat conducting walls spaced apart from each other and a pair of second heat conducting walls spaced apart from each other. The base, the first heat conducting walls and the second heat conducting walls are enclosed to form a hollow accommodating area, wherein the pair of first heat conducting walls are erected with a pitch gradually widening from bottom to top.

In order to achieve the object mentioned above, the present invention provides a temperature equalization and heat dissipation combination module of a lithium battery, including a temperature equalization and heat dissipation container structure and at least one lithium battery. The temperature equalization and heat dissipation container structure includes a base and a housing frame erected on the base. The housing frame includes a pair of first heat conducting walls spaced apart from each other and a pair of second heat conducting walls spaced apart from each other. The base, the first heat conducting walls and the second heat conducting walls are enclosed to form a hollow accommodating area. The lithium battery includes a battery cell and a heat conducting housing disposed at two outer sides of the battery cell and erected in the accommodating area, wherein the pair of first heat conducting walls of the temperature equalization and heat dissipation container structure are erected with a pitch gradually widening from bottom to top, and the lithium battery is pressed between the pair of first heat conducting walls.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, not being used to limit its executing scope. Any equivalent variation or modification made according to appended claims is all covered by the claims claimed by the present invention.

Figure 1:
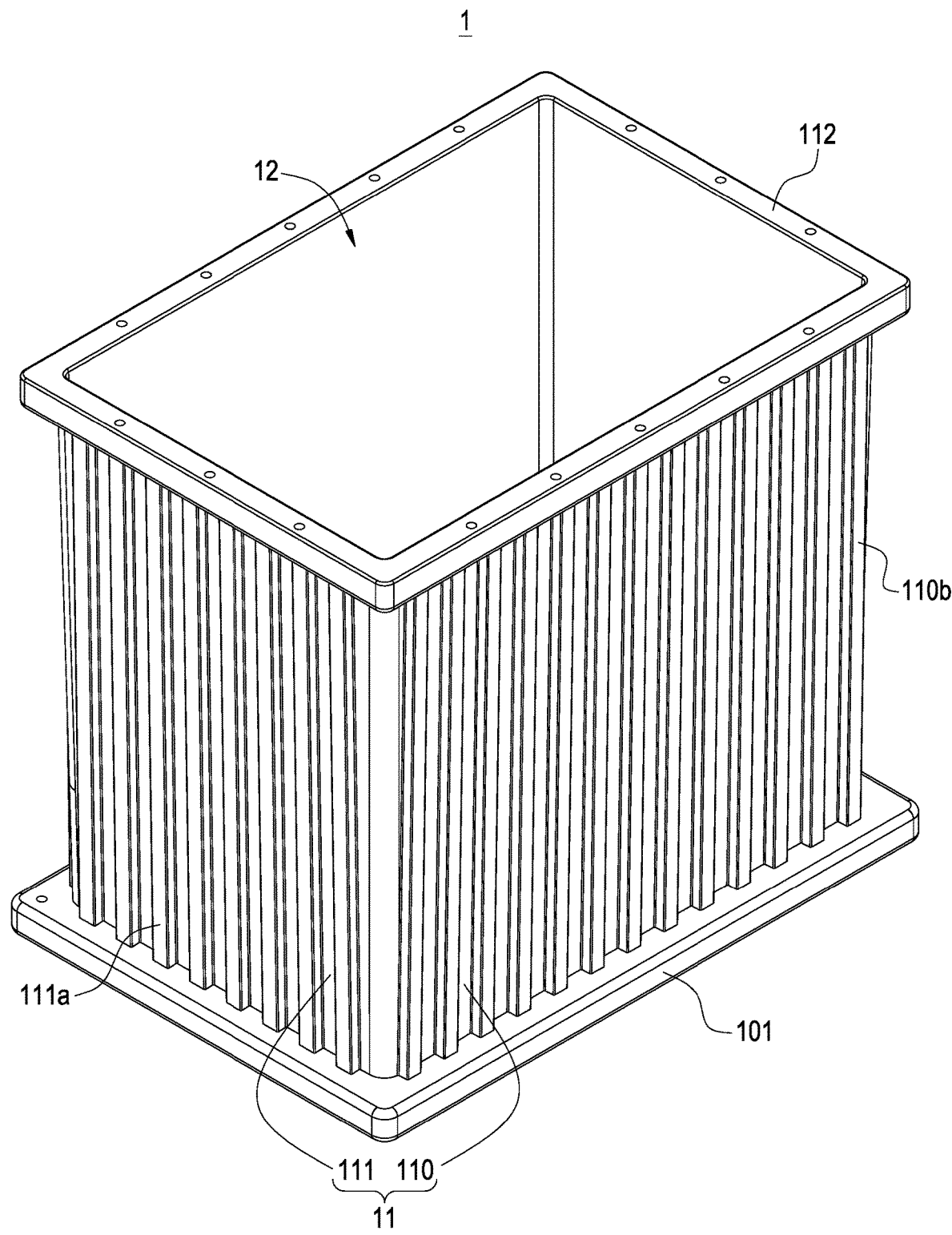
FIG. 1 is a perspective schematic view of the temperature equalization and heat dissipation structure of the present invention.
Figure 2:
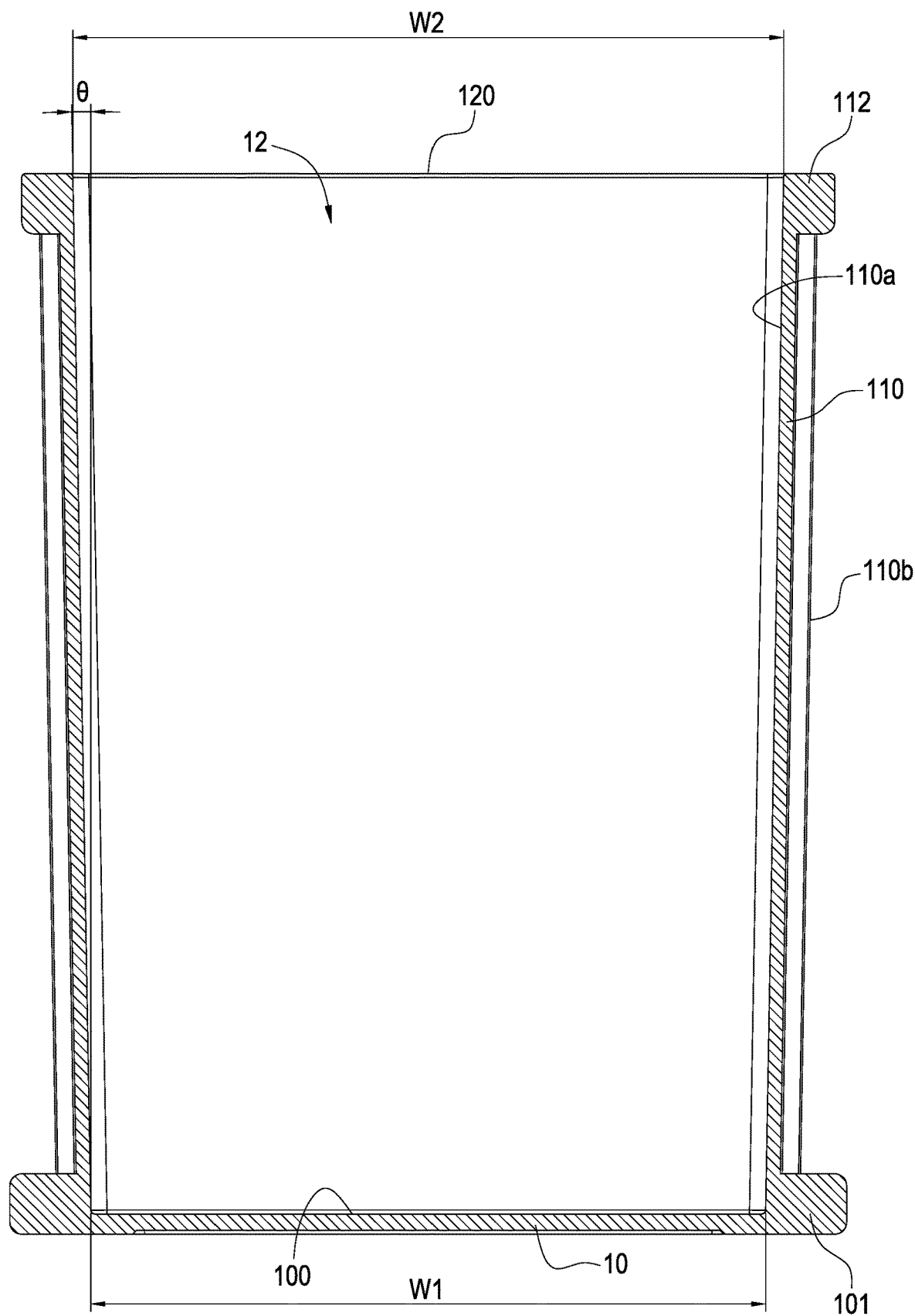
FIG. 2 is a cross sectional view of the temperature equalization and heat dissipation structure of the present invention.

Please refer to FIG. 1 and FIG. 2, which depict a perspective schematic view of the temperature equalization and heat dissipation container structure of the present invention and a cross sectional schematic view of the present invention. The present invention provides a temperature equalization and heat dissipation container structure of a lithium battery and a combination module thereof. The temperature equalization and heat dissipation container structure 1 can be made of good thermal conductivity material, such as aluminum etc., and it includes a base 10 and a housing frame 20 erected on the base 10.

The housing frame 11 includes a pair of first heat conducting walls 110 spaced apart from each other and a pair of second heat conducting walls 111 spaced apart from each other. The base 10, the first heat conducting walls 110 and the second heat conducting walls 111 are enclosed to form a hollow accommodating area 12. As shown in FIG. 2, the base 10 has a bottom surface 100 relative to an inner wall of the accommodating area 12. The first heat conducting wall 110 has a restricting surface 110a relative to the inner wall of the accommodating area 12, and the accommodating area 12 forms an entrance 120 above the housing frame 11. In addition, an outer periphery of the base 10 is further protruded outward to form a lower flange 101. The housing frame 11 is further protruded outward to form an upper flange 112, and a plurality of heat dissipation portions 110b, 111a are provided on outer wall surfaces of the first heat conducting walls 110 and the second heat conducting walls 111. The heat dissipation parts 110b, 111a are protruding ribs standing upright and arranged at a distance from each other and connected between the upper flange 112 and the lower flange 101 separately.

As shown in FIG. 2, the pair of second heat conducting walls 111 of the present invention are erected at a distance parallel to each other, and the pair of first heat conducting walls 110 are erected with a pitch gradually widening from bottom to top. In more detail, the restricting surface 110a of each first heat conducting wall 110 is inclined outwardly by an angle $\theta$, so that a width W1 of the bottom surface 100 of the accommodating area 12 is greater than a width W2 of the entrance 120 above.

Figure 3:
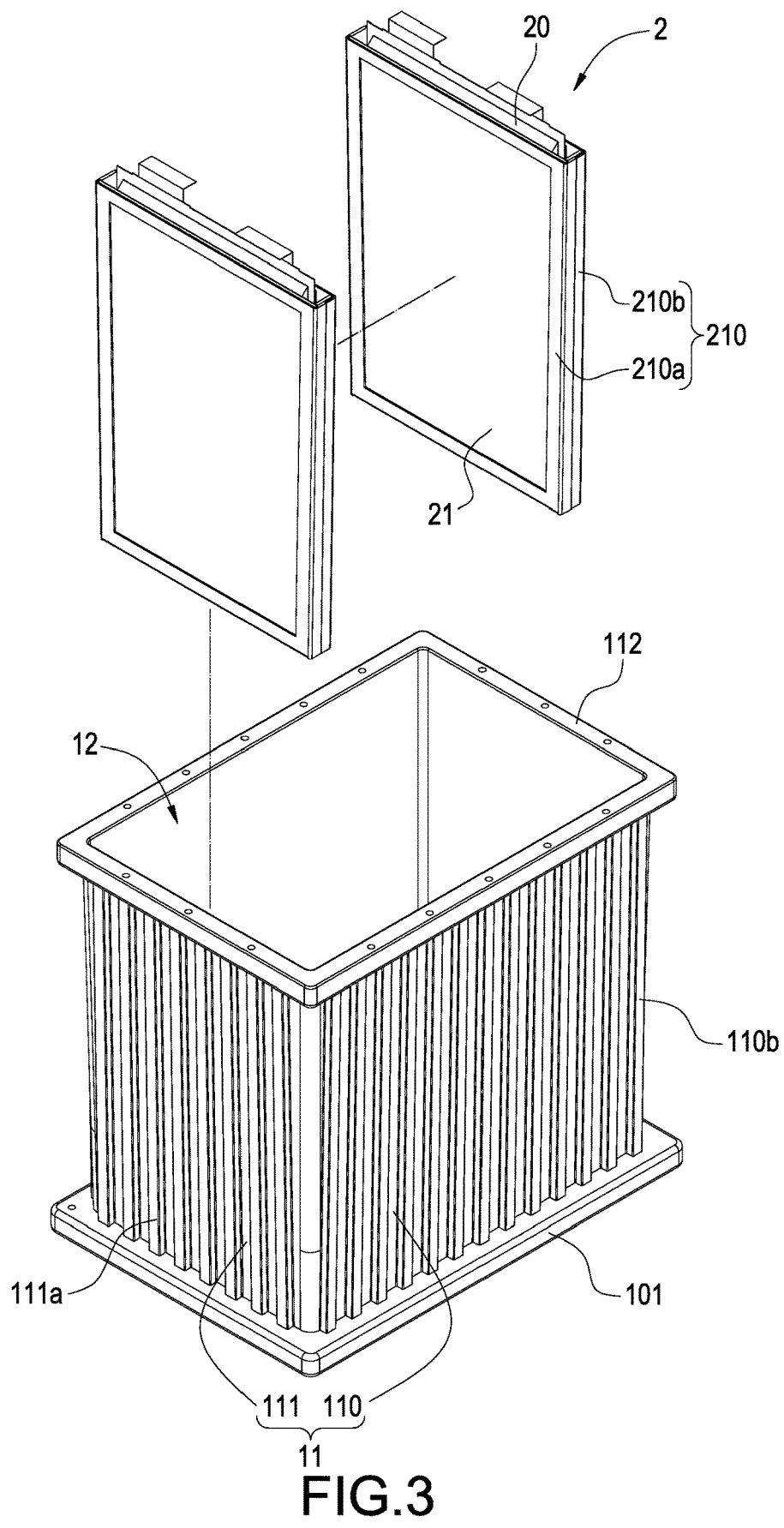
FIG. 3 is a perspective exploded schematic view of the temperature equalization and heat dissipation combination module of the present invention.
Figure 4:
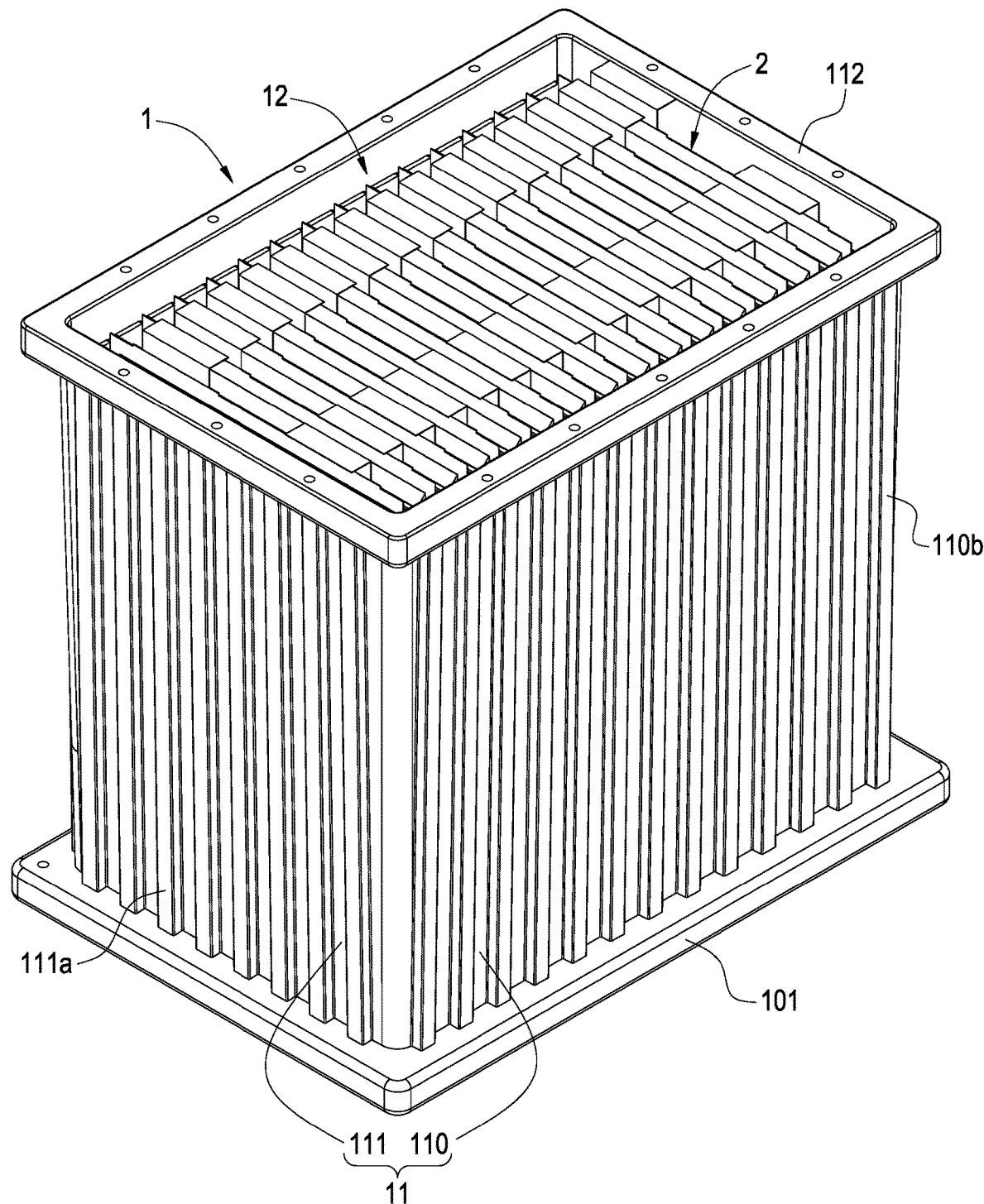
FIG. 4 is a perspective assembly schematic view of the temperature equalization and heat dissipation combination module of the present invention.
Figure 5:
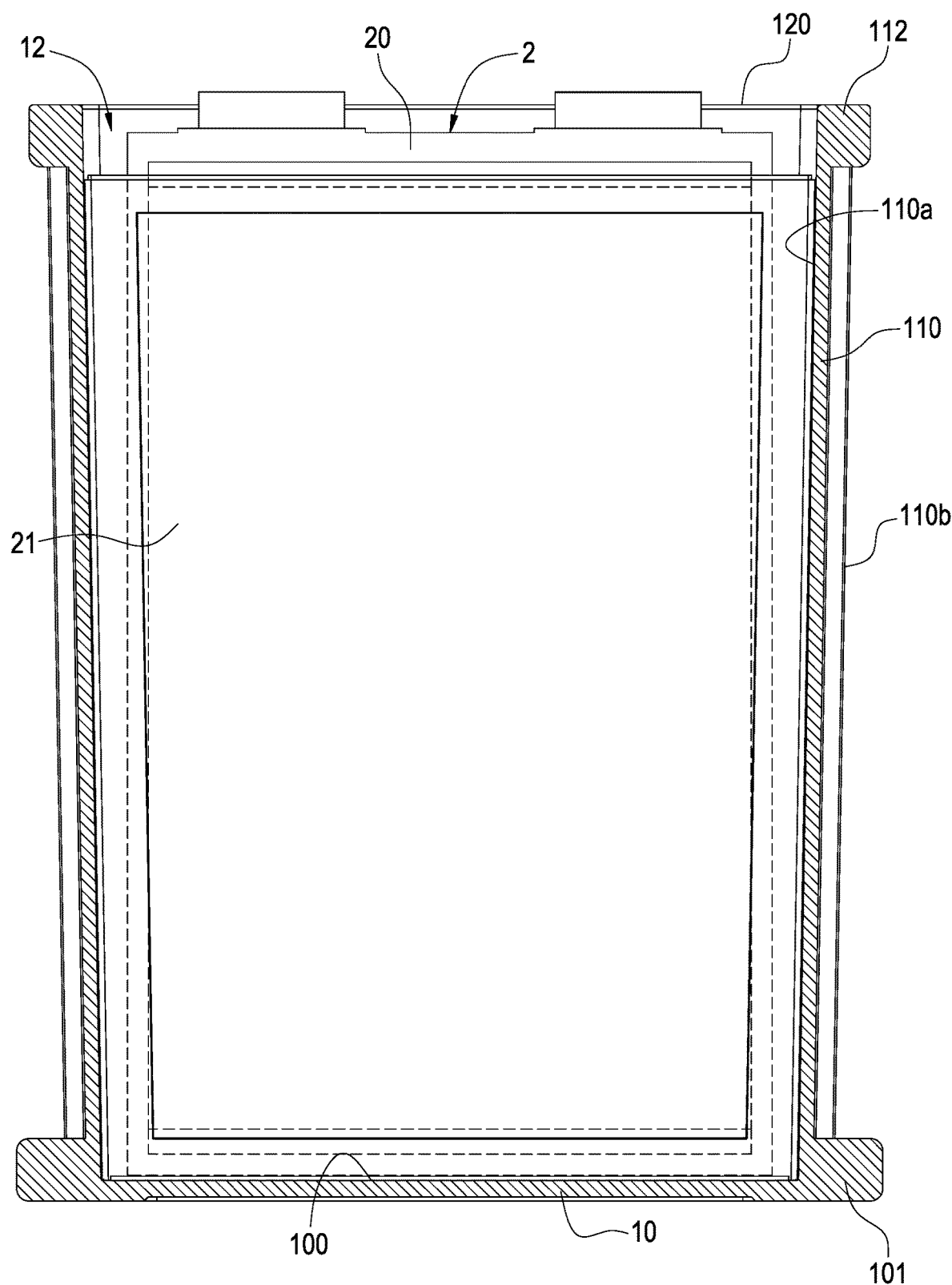
FIG. 5 is a cross sectional view of the temperature equalization and heat dissipation combination module of the present invention.

Please further refer to FIG. 3 and FIG. 4. The above temperature equalization and heat dissipation container structure 1 is provided for containing at least one lithium battery 2 to constitute a temperature equalization and heat dissipation combination module of a lithium battery. The lithium battery 2 can include a battery cell 20 and a heat conducting housing 21 disposed at two outer sides of the battery cell 20, wherein the battery cell 20 can be an aluminum foil type of package, and the heat conducting housing 21 can be made of good thermal conductivity material, such as aluminum, etc., and erected in the accommodating area 12 from the entrance 120 of the temperature equalization and heat dissipation container structure 1 to contact the bottom surface 100 and the restricting surface 110a through the heat conducting housing 21 as shown in FIG. 5, so that the effect of temperature equalization and heat dissipation can be provided for the battery cell 20 of the lithium battery 2. Further, the lithium battery 2 has a thick heat conducting frame portion 210 outside the heat conducting housing 21. The heat conducting frame portion 210 has a front surface 210a and a lateral surface 210b, and the lateral surface 210b is provided corresponding to the restricting surface 110a of the first heat conducting walls 110 to contact thereof. The front surfaces 210a of each lithium battery 2 are contacted with each other when plural lithium batteries 2 are arranged in the temperature equalization and heat dissipation container structure 1.

As shown in FIG. 5, the present invention is provided for disposing a lithium battery 2 pressed between the pair of first heat conducting walls 110 by the pair of first heat conducting walls 110 to be erected with a pitch gradually widening from bottom to top. In this way, the lithium batteries 2 arranged in the temperature equalization and heat dissipation container structure 1 are positioned and the single battery cell can be prevented from shaking. Moreover, each lithium battery 2 can be ensured to contact the temperature equalization and heat dissipation container structure 1, and the heat generated by the battery cell 20 in use is evenly dissipated and conducted to the outside of the temperature equalization and heat dissipation container structure 1. At the same time, the heat will not be accumulated in the lithium battery 2 sandwiched in the middle through front surfaces 210a of lithium batteries 2 contacting with each other. Therefore, a good heat transfer effect of temperature equalization and heat dissipation is achieved through front surfaces 210a contacted with each other and lateral sides 210 contacting the first heat conducting walls 110.

It is worth of noticing that, in the present embodiment, the heat conducting housing 21 of the lithium battery 2 has a shape corresponding to the first heat conducting walls 110. That is, two side of the heat conducting housing 21 are provided with a pitch gradually widening from bottom to top, so that the lithium battery 2 can fully contact the first heat conducting walls 110 as to enhance the heat conduction.

Preferably, a gap is provided between the bottom of the lithium battery 2 and the bottom surface 100 of the base 10 to facilitate the assembly of the temperature equalization and heat dissipation container structure 1. However, the bottom of the lithium battery 2 will contact the bottom surface 100 gradually because of the self-weight.

Therefore, the temperature equalization and heat dissipation container structure of the lithium battery of the present invention and the combination module thereof can be obtained from above mentioned constitution.

In summary, the present invention can indeed achieve the intended purposes of use and solve the lack of prior art. In addition, because the present invention is novel and non-obviousness, it fully meets the requirements of the patent application. The application is applied in accordance with the Patent Law. Please research and grant the present invention to protect the right of the inventor.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A temperature equalization and heat dissipation container structure of a lithium battery, comprising:
   a base; and
   a housing frame erected on the base, and the housing frame including a pair of first heat conducting walls spaced apart from each other and a pair of second heat conducting walls spaced apart from each other; and the base, the first heat conducting walls and the second heat conducting walls being enclosed to form a hollow accommodating area;
   wherein, the pair of first heat conducting walls are erected with a pitch gradually widening from bottom to top,
   a plurality of protruding ribs are disposed vertically and spacedly on outer wall surfaces of the pair of first heat conducting walls and outer wall surfaces of the pair of second heat conducting walls,
   a lower flange is disposed protrusively on an outer periphery of the base,
   an upper flange is disposed protrusively on the housing frame, and
   each protruding rib is connected between the upper flange and the lower flange, and is lower than the lower flange and the upper flange in height.

2. The temperature equalization and heat dissipation container structure of the lithium battery according to claim 1, wherein the pair of second heat conducting walls are erected at a distance parallel to each other.

3. The temperature equalization and heat dissipation container structure of the lithium battery according to claim 1, wherein the base has a bottom surface relative to an inner wall of the accommodating area, and each of the first heat conducting walls has a restricting surface relative to the inner wall of the accommodating area, and the accommodating area forms an entrance above the housing frame.

4. The temperature equalization and heat dissipation container structure of the lithium battery according to claim 3, wherein the restricting surface of each first heat conducting wall is inclined outwardly by an angle, so that a width of the bottom surface of the accommodating area is less than a width of the entrance above.

5. A temperature equalization and heat dissipation combination module of a lithium battery, comprising:
a temperature equalization and heat dissipation container structure including a base and a housing frame erected on the base; the housing frame including a pair of first heat-conducting walls spaced apart from each other and a pair of second heat conducting walls spaced apart from each other; and the base, the first heat conducting walls and the second heat conducting walls being enclosed to form a hollow accommodating area; and
at least one lithium battery including a battery cell and a heat conducting housing disposed at two outer sides of the battery cell and erected in the accommodating area;
wherein, the pair of first heat conducting walls of the temperature equalization and heat dissipation container structure are erected with a pitch gradually widening from bottom to top, and the lithium battery is pressed between the pair of first heat conducting walls,
a plurality of protruding ribs are disposed vertically and spacedly on outer wall surfaces of the pair of first heat conducting walls and outer wall surfaces of the pair of second heat conducting walls,
a lower flange is disposed protrusively on an outer periphery of the base,
an upper flange is disposed protrusively on the housing frame, and
each protruding rib is connected between the upper flange and the lower flange, and is lower than the lower flange and the upper flange in height.

6. The temperature equalization and heat dissipation combination module of the lithium battery according to claim 5, wherein the lithium battery has a thick heat conducting frame outside the heat conducting housing; the heat conducting frame portion has a front surface and a lateral surface, and the lateral surface contacts an inner wall of each first heat conducting wall.

7. The temperature equalization and heat dissipation combination module of the lithium battery according to claim 6, wherein a quantity of the lithium battery is plural, and a front surface of each lithium battery is contacted with each other.

8. The temperature equalization and heat dissipation combination module of the lithium battery according to claim 6, wherein the heat conducting housing has a shape corresponding to the first heat conducting walls; and two side of the heat conducting housing are provided with a pitch gradually widening from bottom to top.

* * * * *